United States Patent
Hou et al.

(10) Patent No.: US 9,158,158 B2
(45) Date of Patent: Oct. 13, 2015

(54) LIQUID CRYSTAL DISPLAY DEVICE AND PHASE COMPENSATION METHOD FOR THE SAME

(71) Applicant: Beijing BOE Optoelectronics Technology Co., Ltd., Beijing (CN)

(72) Inventors: Xuecheng Hou, Beijing (CN); Ang Xiao, Beijing (CN); Kai Lu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 161 days.

(21) Appl. No.: 13/943,002

(22) Filed: Jul. 16, 2013

(65) Prior Publication Data
US 2014/0160400 A1   Jun. 12, 2014

(30) Foreign Application Priority Data

Sep. 17, 2012   (CN) .......................... 2012 1 0345574

(51) Int. Cl.
*G02F 1/1335* (2006.01)
*G02F 1/13363* (2006.01)
*G02F 1/139* (2006.01)

(52) U.S. Cl.
CPC ...... *G02F 1/13363* (2013.01); *G02F 1/133634* (2013.01); *G02F 1/1396* (2013.01); *G02F 2001/133638* (2013.01); *G02F 2413/04* (2013.01); *G02F 2413/06* (2013.01)

(58) Field of Classification Search
None
See application file for complete search history.

(56) References Cited

U.S. PATENT DOCUMENTS

| | | | |
|---|---|---|---|
| 5,532,851 A * | 7/1996 | Usami | 349/117 |
| 2004/0233358 A1 | 11/2004 | Wu et al. | |
| 2004/0257506 A1* | 12/2004 | Tashiro et al. | 349/123 |
| 2005/0089265 A1* | 4/2005 | Ide | 385/16 |
| 2005/0213006 A1 | 9/2005 | Baek | |
| 2007/0200986 A1* | 8/2007 | Ong | 349/117 |

(Continued)

FOREIGN PATENT DOCUMENTS

| EP | 1750165 A2 | 2/2007 |
|---|---|---|
| JP | 2002072212 A | 3/2002 |

OTHER PUBLICATIONS

European Patent Office Extended Search Report for corresponding European Patent Application No. 13182213.2 issued on Jan. 2, 2014; nine (9) pages.

(Continued)

*Primary Examiner* — Richard Kim
*Assistant Examiner* — Ryan Crockett
(74) *Attorney, Agent, or Firm* — Ladas & Parry LLP (57) ABSTRACT

A liquid crystal display device and a phase compensation method for the same are provided. The liquid crystal display device includes: a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate; the first polarizer assembly including a first polarizing plate and a first optical retardation thin film; the second polarizer assembly including a second polarizing plate and a second optical retardation thin film; wherein, the first polarizer assembly further includes a first wave plate; the second polarizer assembly further includes a second wave plate.

10 Claims, 4 Drawing Sheets

(56) References Cited

U.S. PATENT DOCUMENTS

| | | | |
|---|---|---|---|
| 2009/0033837 A1* | 2/2009 | Molsen et al. | 349/96 |
| 2010/0026936 A1* | 2/2010 | Uesaka et al. | 349/75 |
| 2010/0289988 A1* | 11/2010 | Sakai et al. | 349/96 |
| 2011/0079997 A1* | 4/2011 | Heim | 283/85 |
| 2012/0056211 A1* | 3/2012 | Kitagawa et al. | 257/88 |

OTHER PUBLICATIONS

English machine translation of JP2002072212 (listed above), from machine translation feature of LexisNexis TotalPatent.

Office Action from European Patent Office in corresponding European Patent Application No. 13182213.2 issued on Feb. 25, 2015; four (4) pages.

* cited by examiner

LIQUID CRYSTAL DISPLAY DEVICE AND PHASE COMPENSATION METHOD FOR THE SAME

CROSS REFERENCE TO RELATED APPLICATIONS

This application claims priority from Chinese National Application No. 201210345574.3, filed on Sep. 17, 2012, the contents of which are incorporated herein by reference.

BACKGROUND

Embodiments of the present invention relate to a liquid crystal display device and a phase compensation method for the same.

With their small volume, light weight, low power consumption, no radiation, good display effect and other advantages, liquid crystal display devices have got rapid development in recent years, and among them, a Twisted Nematic (TN) mode is most mature. However, a liquid crystal display device of the TN mode has its own defects. When light rays emitted from a backlight source pass through a liquid crystal display panel, the intensity of light transmitted by the display varies due to difference in the angle of the incident light rays at different viewing angles, and the display effect brought about by it also varies.

Because the viewing angle of a liquid crystal display device results from the optical anisotropy caused by the anisotropy of liquid crystal molecules fundamentally, the viewing angle characteristic of the LCD may be improved so long as a thin film with optical anisotropy is added to a surface of the liquid crystal display device to reduce a light-leakage phenomenon upon display in a dark state. This method is called as an optical compensation film mode of liquid crystal display devices. This method is considered as a simple, effective and lower-cost method because it does not change the process flow of production in prior art and has been applied widely.

Figure 1:
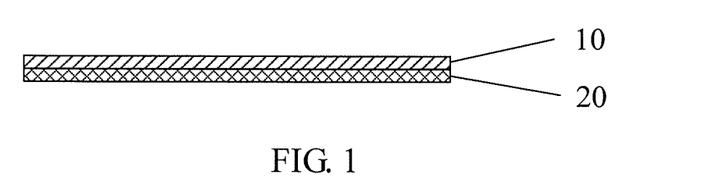
FIG. 1 is a structurally schematic view showing a polarizer of a conventional liquid crystal display device.

However, upon display of the liquid crystal display device in a dark state, there may be two kinds of light leakage: light leakage caused by a positive liquid crystal layer of a liquid crystal cell in the liquid crystal display device and light leakage caused by a polarizer. The light leakage caused by the positive liquid crystal layer of the liquid crystal cell is usually compensated by way of superposing a negative optical film that is symmetrical to the liquid crystal layer in prior art, and for more details, please refer to FIG. 1, which shows a structure of the polarizer that is commonly used in liquid crystal display devices. In FIG. 1, the polarizer is mainly divided into two parts: a polarizing plate 10 and an optical retardation thin film 20. As for a specific structure of the polarizing plate 10, there are a protective film, a low reflective layer, an antiglare layer, a supporting layer of cellulose tri-acetate (TAC), a polarizing layer of polyvinyl alcohol (PVA), and a supporting layer of TAC in sequence from top to bottom, where, what serves a polarizing function chiefly is the polarizing layer of PVA; the chief function of the optical retardation thin film 20 is to compensate light leakage caused by the liquid crystal cell, and its material may be a double-optical-axis optical layer, and may also be a plate with negative optical anisotropy, for example, C-plate or a negative, non-toxic and liquid-crystal optical compensation layer (WV DLC). Light leakage of liquid crystals is compensated by the optical retardation thin film 20, and if the birefringence effect of the positive liquid crystal cell is to be compensated fully, then the retardation effect of the optical retardation thin film 20 has to coincide with the positive liquid crystal cell, namely, $$(n_e-n_o)_c d_c + (n_e-n_o)_{LC} d_{LC} = 0$$

where $n_e$ and $n_o$ are refractivities of the optical retardation thin film to an e light and an o light, respectively, $d_c$ is thickness of the optical retardation thin film, and $d_{LC}$ is thickness of the liquid crystal cell. Here, a linearly polarized light is vertically incident onto a wafer, such as the optical retardation thin film or the liquid crystal cell, so that the incident light is decomposed with oscillation into two components, i.e. an o light perpendicular to an optical axis (an o oscillation) and an e light parallel to the optical axis (an e oscillation). The o light and the e light propagate along the same direction, but have different propagating speeds (owing to different refractivities), so that an optical path difference of $(n_e-n_o)d$ is generated between the two kinds of light after they passing through the wafer, where d is thickness of the wafer, and, $n_e$ and $n_o$ are refractivities of the wafer to an e light and an o light, respectively. The e light and the o light are generally combined into an elliptically polarized light.

Although light leakage caused by the positive liquid crystal cell can be eliminated through addition of the optical retardation thin film 20, light leakage may be caused by the polarizer itself as well. When the light ray is deflected from the vertical direction, due to a polarizing function of the polarizer, the fast-axis light and the slow-axis light coexist upon it enters the liquid crystal layer, and the phase difference between them is directly proportional to the optical path difference Δnd. In this case, the phase difference makes a linearly polarized light that is obliquely incident turn into an elliptically polarized light after it passes through the birefringent liquid crystal layer, and it cannot be absorbed by the polarizer on the other side completely after it exits. Thus, a light leakage phenomenon occurs, leading to problems that the contrast of display units is degraded, the viewing angle is narrowed, the display effect becomes worse, and so on. In the state of some large viewing angles, a situation that transmittance in a dark state is greater than transmittance in a bright state might also arise, namely inversion of the contrast, which is a problem in viewing angle caused by the anisotropy of liquid crystal molecules. Therefore, light leakage caused by the polarizer cannot be ignored.

SUMMARY

According to an embodiment of the invention, there is provided a liquid crystal display device, including: a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate; the first polarizer assembly including a first polarizing plate and a first optical retardation thin film; the second polarizer assembly including a second polarizing plate and a second optical retardation thin film; wherein, the first polarizer assembly further includes a first wave plate; the second polarizer assembly further includes a second wave plate.

In one example, relative to the first polarizing plate, the first optical retardation thin film and the first wave plate are disposed on the liquid crystal layer side; and relative to the second polarizing plate, the second optical retardation thin film and the second wave plate are disposed on the liquid crystal layer side.

In one example, the first polarizer assembly acts to make light incident from the lower substrate side polarized and then perform a phase delay on it;

the liquid crystal layer acts to perform a positive phase delay on the light coming out of the first polarizer assembly;

the second polarizer assembly acts to perform a phase delay on the light exiting from the liquid crystal layer, so as to compensate the light leakage produced during display.

In one example, the first polarizer assembly is located on an inner surface of the lower substrate, and the second polarizer assembly is located on an inner surface of the upper substrate; or the first polarizer assembly is located on an outer surface of the lower substrate, and the second polarizer assembly is located on an outer surface of the upper substrate.

In one example, the thickness of liquid crystal in the liquid crystal layer is determined according to optical path differences generated by each of the first wave plate and the second wave plate and the wavelength of an incident light.

In one example, the optical path differences generated by each of the first wave plate and the second wave plate are the same.

In one example, the optical path differences generated by each of the first wave plate and the second wave plate each are ⅙ of the wavelength; and the first wave plate and the second wave plate are ⅙ wave plates.

In one example, the relationship between thickness of liquid crystal in the liquid crystal layer and the optical path differences generated by each of the first wave plate and the second wave plate is that, $$d \approx \sqrt{3}\,\frac{\lambda}{2\pi(n_e - n_o)},$$

wherein, $n_e$ and $n_o$ are refractivities of liquid crystal to an e light and an o light, respectively, is the wavelength of an incident light, the wavelength range of the incident light is between 400 nm and 800 nm, and d is the thickness of liquid crystal.

In one example, the first wave plate is located between the first polarizing plate and the first optical retardation thin film; or the first optical retardation thin film is located between the first polarizing plate and the first wave plate;

the second wave plate is located between the second polarizing plate and the second optical retardation thin film; or, the second optical retardation thin film is located between the second polarizing plate and the second wave plate.

According to another embodiment of the invention, there is provided a phase compensation method for a liquid crystal display device, the liquid crystal display device including a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate, wherein, a first wave plate is added to a first polarizer assembly of the liquid crystal display device and a second wave plate is added to a second polarizer assembly; the method further comprising:

conducting a phase delay on a light incident from a lower substrate after it is polarized by the first polarizer assembly;

conducting a positive phase delay on the light coming out of the first polarizer assembly by liquid crystals in the liquid crystal layer of the liquid crystal display device;

conducting a phase delay on the light coming out of the liquid crystal layer by the second polarizer assembly, so as to compensate light leakage produced during display.

In one example, the relationship between the positive phase delay conducted on the light coming out of the first polarizer assembly by liquid crystal in the liquid crystal layer of the liquid crystal display device and the phase delay conducted on the light by the first polarizer assembly is that, optical path differences of the two are $$\sqrt{3}\,\frac{\lambda}{2\pi}$$

respectively, in which, λ is the wavelength of the incident light.

In one example, the first polarizer assembly includes a first polarizing plate, a first optical retardation thin film and the first wave plate; and the second polarizer assembly includes a second polarizing plate, a second optical retardation thin film and the second wave plate;

the first wave plate is located between the first polarizing plate and the first optical retardation thin film; or, the first optical retardation thin film is located between the first polarizing plate and the first wave plate;

the second wave plate is located between the second polarizing plate and the second optical retardation thin film; or, the second optical retardation thin film is located between the second polarizing plate and the second wave plate.

In one example, relative to the first polarizing plate, the first optical retardation thin film and the first wave plate are disposed on the liquid crystal layer side; and relative to the second polarizing plate, the second optical retardation thin film and the second wave plate are disposed on the liquid crystal layer side.

Regarding embodiments of the invention, by means of adding one wave plate to each of upper and lower polarizer assemblies of the liquid crystal display device, and utilizing the phase compensation of the liquid crystal layer per se in conjunction, light leakage caused by the polarizer assemblies is compensated, so that disadvantageous impacts can be eliminated by utilizing characteristics of the liquid crystal layer per se effectively and light leakage caused by the polarizer assemblies is reduced. Thus, contrast of the liquid crystal display is enhanced, and viewing angle for display is increased.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which come(s) into the scope sought for protection by the invention.

In practical applications, a beam of light will turn into two beams of light upon entering certain crystals, the crystals are called as birefringence-appearance substances, and optical assemblies having the birefringent property can be called as wave plates. Generally, light turns into a linearly polarized light after it travels through a polarizing plate, and if the speed oscillating along a certain direction (an fast axis) is faster than the oscillating speed along the vertical direction (a slow axis) of the fast axis by ¼ of the wavelength after the linearly polarized light passes through a wave plate, then the wave plate is called as a quarter-wave plate. When two quarter-wave plates are added between two polarizing plates, polarized light in various directions can be obtained. When an fast axis and a slow axis of one ¼ wave plate lay across each other and each of them makes an angle of 45 degrees with the polarization axis of a polarizer, a circularly polarized light can be obtained; or an fast axis and a slow axis of a ¼ wave plate lay across each other and each of them makes an arbitrary angle with the polarization axis of a polarizer, an elliptically polarized light can be obtained.

Based on the above characteristic, the basic idea of the invention is that, by utilizing the birefringence effect of a positive liquid crystal layer per se and adding two wave plates, which function together so that linearly polarized light incidents from different directions are compensated to the same exiting position, light leakage caused by a polarizer is effectively improved, contrast of a liquid crystal display device is raised, the viewing angle for display is increased.

In embodiments of the invention, the liquid crystal display device includes: a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate; the first polarizer assembly including a first polarizing plate and a first optical retardation thin film; the second polarizer assembly including a second polarizing plate and a second optical retardation thin film;

The first polarizer assembly further includes a first wave plate; the second polarizer assembly further includes a second wave plate;

The first polarizer assembly acts to make light incident from the lower substrate polarized and then perform a phase delay on it;

The liquid crystal layer acts to perform a positive phase delay on the light coming out of the first polarizer assembly;

The second polarizer assembly acts to perform a phase delay on the light exiting from the liquid crystal layer, so that light leakage produced during display is compensated.

It is to be noted that, the first polarizer assembly is located on an inner surface of the lower substrate, and the second polarizer assembly is located on an inner surface of the upper substrate; or the first polarizer assembly is located on an outer surface of the lower substrate, and the second polarizer assembly is located on an outer surface of the upper substrate.

In order to make objects, technical details and advantages of the invention more apparent, hereinafter, the invention will be further described in detail by giving embodiments and referring to accompanies drawings.

Figure 2:
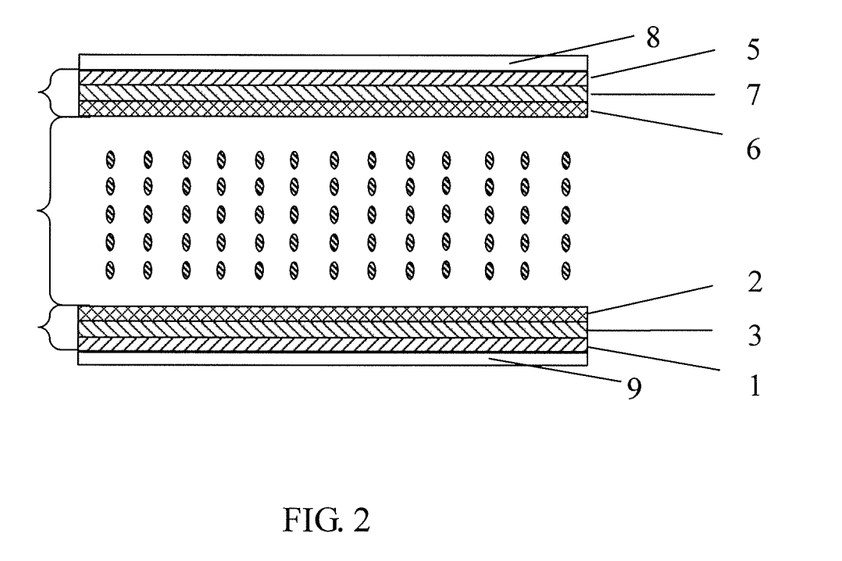
FIG. 2 is a structurally schematic view showing a liquid crystal display device according to an embodiment of the invention.

FIG. 2 shows the structure of a liquid crystal display device according to an embodiment of the invention. As shown in FIG. 2, the liquid crystal display device includes: a first polarizer assembly 23 located on an inner surface of a lower substrate 9, a second polarizer assembly 21 located on an inner surface of an upper substrate 8, and a liquid crystal layer 4 located between the lower substrate 9 and the upper substrate 8; wherein, the first polarizer assembly 23 includes a first polarizing plate 1, a first optical retardation thin film 2 and a first wave plate 3;

the second polarizer assembly 21 includes a second polarizing plate 5, a second optical retardation thin film 6 and a second wave plate 7;

The liquid crystal layer 4 acts to perform a phase delay on a light incident through the first polarizer assembly 23, and the thickness of liquid crystal in the liquid crystal layer 4 is determined according to optical path differences generated by each of the first wave plate 3 and the second wave plate 7.

Specifically, the optical path differences generated by each of the first wave plate 3 and the second wave plate 7 are the same.

Wherein, the optical path differences generated by each of the first wave plate 3 and the second wave plate 7 each are ⅙ of the wavelength.

Wherein, the relationship between thickness of liquid crystal in the liquid crystal layer and the optical path differences generated by each of the first wave plate 3 and the second wave plate 7 is as follows: when $n_e \approx n_o \approx n$, $$\Gamma = (n_e - n_o)d \frac{2\pi}{\lambda} \frac{n_e + n_o}{2n_o n_e^2} \sin^2\theta \approx (n_e - n_o)d \frac{2\pi}{\lambda} \frac{\theta^2}{n_o^2} \approx 4\sqrt{3}\,\Delta\varphi,$$

wherein $$\Delta\varphi \approx \frac{\theta^2}{4n_o^2},$$

then an optical path difference $$\Delta nd = (n_e - n_o)d \approx \sqrt{3}\,\frac{\lambda}{2\pi},$$

in which $\Gamma$ is the phase delay of liquid crystal, $\Delta\varphi$ is the angle between incident vectors of linearly polarized light $O_1$ and $O_2$, and $\theta$ is the incident angle of a light ray. Namely, $$d \approx \sqrt{3}\,\frac{\lambda}{2\pi(n_e - n_o)},$$

in which d is the thickness of liquid crystal, $n_e$ and $n_o$ are refractivities of liquid crystals to an e light and an o light, respectively, λ is the wavelength of an incident light, and the wavelength range of the incident light is between 400 nm and 800 nm.

For example, relative to the first polarizing plate 1, the first optical retardation thin film 2 and the first wave plate 3 are disposed on the liquid crystal layer side; and relative to the second polarizing plate 5, the second optical retardation thin film 6 and the second wave plate 7 are disposed on the liquid crystal layer side.

In addition, the first wave plate 3 may be located between the first polarizing plate 1 and the first optical retardation thin film 2; or, the first optical retardation thin film 2 may be located between the first polarizing plate 1 and the first wave plate 3. Namely, positions of the first optical retardation thin film 2 and the first wave plate 3 may be interchanged. Likewise, the second wave plate 7 may be located between the second polarizing plate 5 and the second optical retardation thin film 6; or, the second optical retardation thin film 6 may be located between the second polarizing plate 5 and the second wave plate 7. Namely, positions of the second optical retardation thin film 6 and the second wave plate 7 may be interchanged.

The phase compensation process of the above liquid crystal display device will be described below with reference to a specific embodiment. Because human eyes are most sensitive to a green light, the optical principle of phase compensation will be explained in detail on the basis of the green light of 550 nm. Here, each of the first wave plate and the second wave plate is a ⅙ wave plate.

Figure 3:
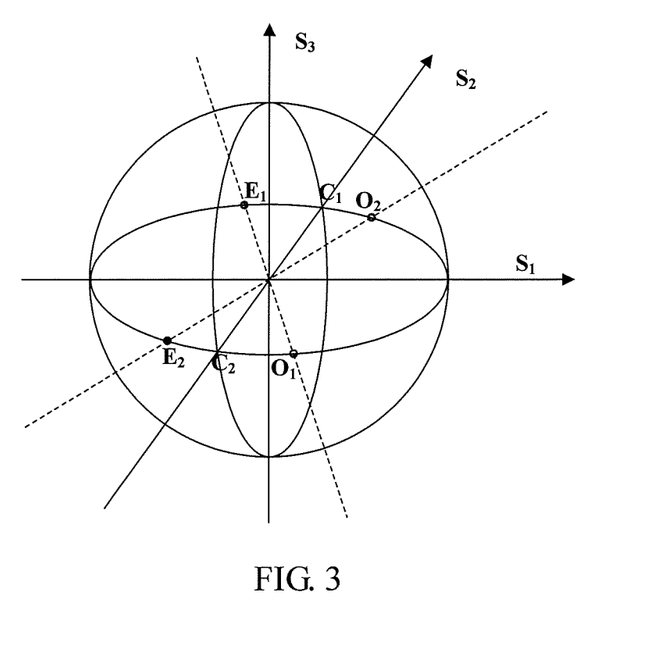
FIG. 3 is a schematic view showing the compensation principle represented by a Poincare sphere of a liquid crystal display device according to an embodiment of the invention.

As shown in FIG. 3, after a beam of light travels through the first polarizer, linearly polarized light is obtained, and is incident from $O_1$ and $O_2$, respectively. If no phase delay is conducted, light incident from the point $O_1$ will exit from a point $E_1$, and an elliptically polarized light will be formed after they pass through the liquid crystal layer. Thereby, it cannot be absorbed by the second polarizer fully, leading to light leakage. Therefore, it is necessary to conduct a phase delay treatment, so that the light incident from the point $O_1$ will exit from an exit point $E_2$ of light incident from $O_2$, namely, it is necessary that the light incident from the point $O_1$ be modulated to the point $E_2$ for exit.

Figure 4:
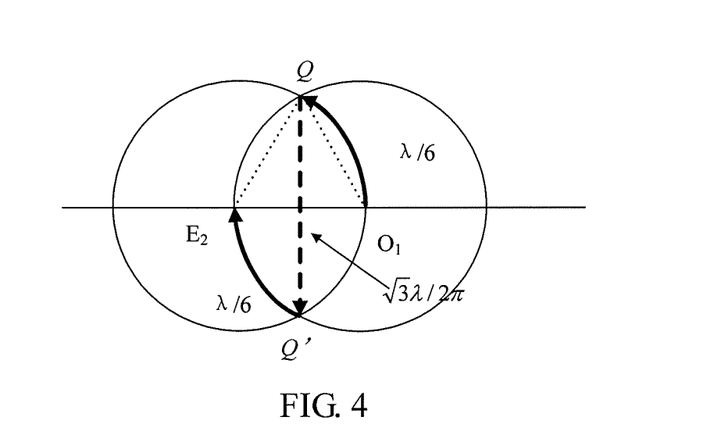
FIG. 4 is a schematic view showing the principle of phase compensation of the liquid crystal display device according to the embodiment of the invention.

In conjunction with FIG. 4, after the linearly polarized light incident from the point $O_1$ is subjected to phase delay by a ⅙-wave plate, an effective optical path difference is: $\Delta nd=\lambda/6$ (equal to ⅙ of 550 nm approximately, i.e. 92 nm); while thickness of the liquid crystal layer is thicker than a conventional liquid crystal layer by 0.152 μm, and after it is subjected to phase delay by liquid crystal of an extra portion relative to the conventional liquid crystal layer, an effective optical path difference is: $\Delta nd=\sqrt{3}\lambda/(2\pi)$ (equal to $\sqrt{3}/(2\pi)$ of 550 nm approximately, i.e. 152 nm). Linear polarized light is refracted by a first ⅙ wave plate from $O_1$ to Q, the linear polarized light is refracted by the liquid crystal layer to Q', and after travelling through a second ⅙ wave plate, the linearly polarized light is refracted from Q' to the $E_2$.

Figure 5:
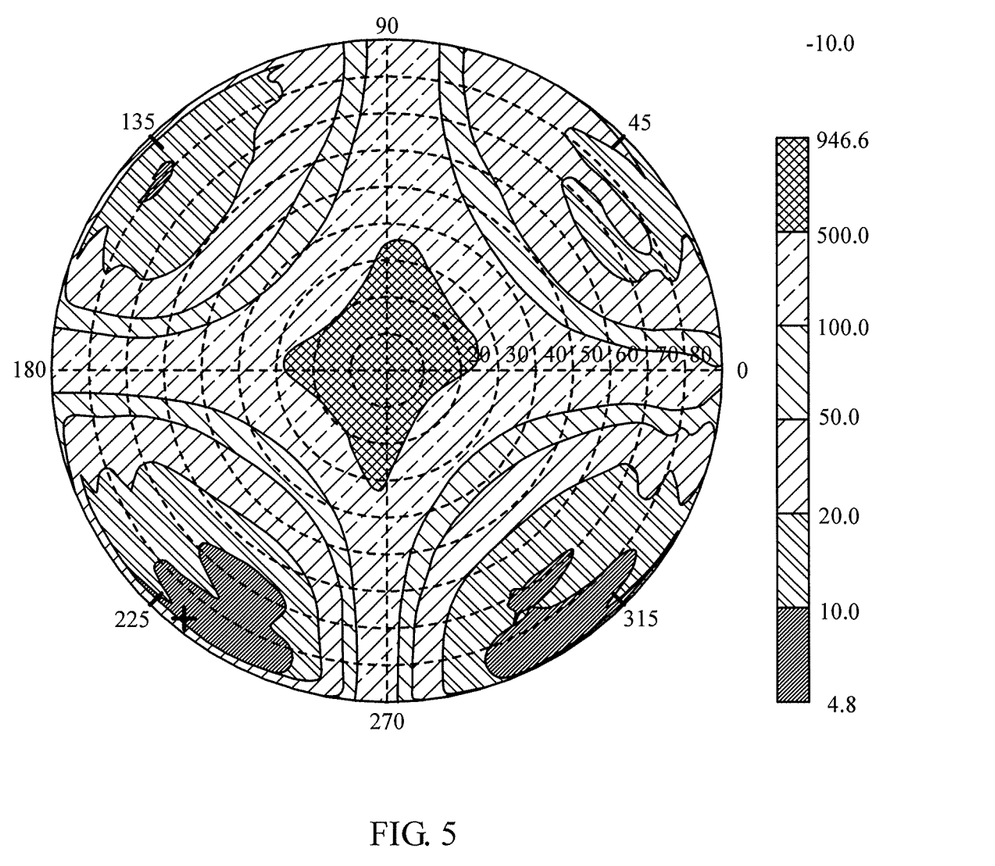
FIG. 5 is a schematic view showing the measurement of viewing angle of the conventional liquid crystal display device.
Figure 6:
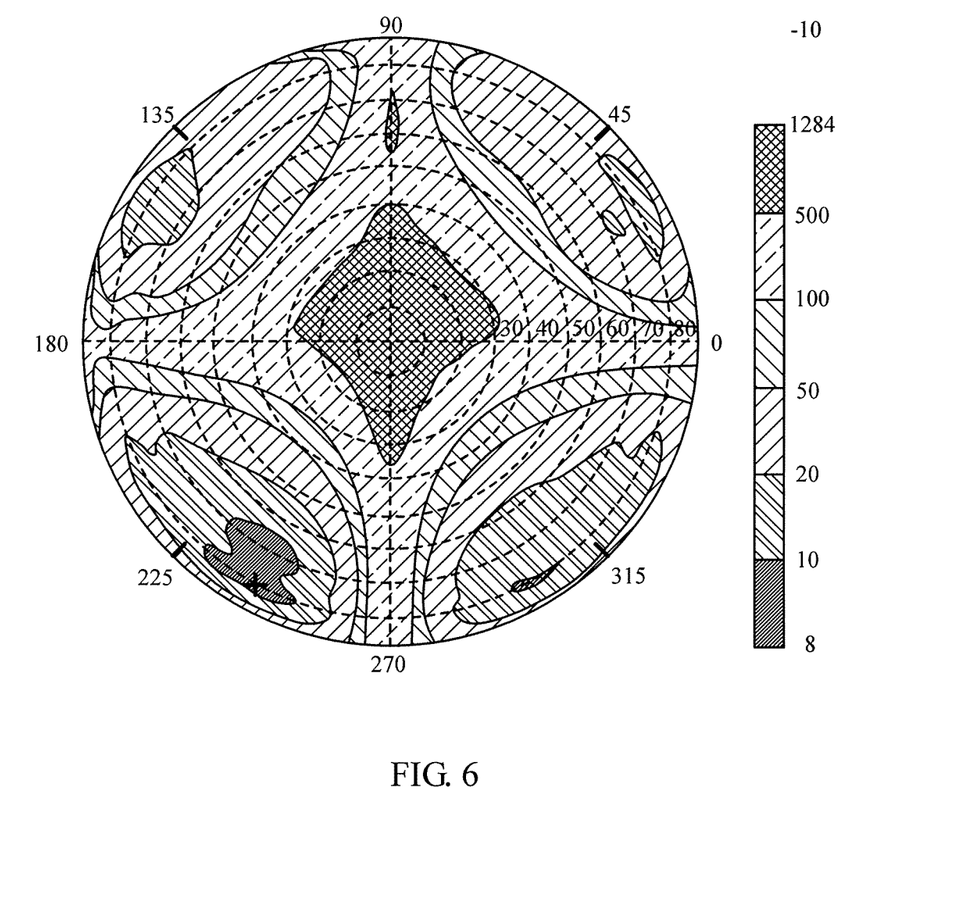
FIG. 6 is a schematic view showing the measurement of viewing angle of a liquid crystal display device according to an embodiment of the invention.

FIG. 5 and FIG. 6 are schematic views showing the measurement of viewing angle of a conventional liquid crystal display device and the measurement of viewing angle of the above liquid crystal display device according to embodiments of the invention, where, viewing angles of liquid crystal display devices are represented by different grayscales. As can be seen, a zone with a small range of viewing angle in the liquid crystal display device provided by embodiments of the invention is greatly reduced in extent as compared to the conventional liquid crystal display device, thereby increasing the viewing angle of the liquid crystal display device effectively.

According to an embodiment of the invention, there is further provided a phase compensation method for a liquid crystal display device, the method comprising:

a first wave plate is added to a first polarizer assembly of the liquid crystal display device and a second wave plate is added to a second polarizer assembly;

a phase delay happens to light incident from a lower substrate after the incident light is polarized by the first polarizer assembly;

a positive phase delay is conducted on the light coming out of the first polarizer assembly by liquid crystal in a liquid crystal layer of the liquid crystal display device;

a phase delay is conducted on the light coming out of the liquid crystal layer by the second polarizer assembly, so as to compensate light leakage produced during display.

Here, the first polarizer assembly includes a first polarizing plate, a first optical retardation thin film and a first wave plate; the second polarizer assembly includes a second polarizing plate, a second optical retardation thin film and a second wave plate; and the first wave plate and the second wave plate are ⅙ wave plates, respectively.

It is possible that the first wave plate is located between the first polarizing plate and the first optical retardation thin film; or it is also possible that the first optical retardation thin film is located between the first polarizing plate and the first wave plate. Likewise, it is possible that the second wave plate is located between the second polarizing plate and the second optical retardation thin film; or, it is also possible that the second optical retardation thin film is located between the second polarizing plate and the second wave plate.

Wherein, after phase delays are conducted on light by the first wave plate and the second wave plate, optical path differences generated by each of them are the same.

Further, the relationship between the positive phase delay conducted on the light coming out of the first polarizer assembly by liquid crystal in the liquid crystal layer of the liquid crystal display device and the phase delay conducted on the light by the first polarizer assembly is that, optical path differences of the two $$\sqrt{3}\,\frac{\lambda}{2\pi}$$

are respectively.

Specifically, the liquid crystal display device stated in the embodiment of the invention may be a liquid crystal panel, a liquid crystal display, a liquid crystal television, a cell phone, a tablet computer or other display device.

The descriptions made above are merely exemplary embodiments of the invention, but are not used to limit the protection scope of the invention. The protection scope of the invention is determined by attached claims.

What is claimed is:

1. A liquid crystal display device, including: a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate; the first polarizer assembly including a first polarizing plate and a first optical retardation thin film; the second polarizer assembly including a second polarizing plate and a second optical retardation thin film; wherein, the first polarizer assembly further includes a first wave plate; the second polarizer assembly further includes a second wave plate, wherein, the thickness of liquid crystal in the liquid crystal layer is determined according to optical path differences generated by each of the first wave plate and the second wave plate and the wavelength of an incident light, and wherein the relationship between thickness of liquid crystal in the liquid crystal layer and the optical path differences generated by each of the first wave plate and the second wave plate is that $$d \approx \sqrt{3}\frac{\lambda}{2\pi(n_e - n_o)},$$

wherein $n_e$ and $n_o$ are refractivities of liquid crystal to an I light and an o light, respectively, $\lambda$ is the wavelength of the incident light, the wavelength range of the incident light is between 400 nm and 800 nm, and d is the thickness of liquid crystal.

2. The liquid crystal display device according to claim 1, wherein, relative to the first polarizing plate, the first optical retardation thin film and the first wave plate are disposed on the liquid crystal layer side; and relative to the second polarizing plate, the second optical retardation thin film and the second wave plate are disposed on the liquid crystal layer side.

3. The liquid crystal display device according to claim 1, wherein, the first polarizer assembly acts to make light incident from the lower substrate side polarized and then perform a phase delay on it;

the liquid crystal layer acts to perform a positive phase delay on the light coming out of the first polarizer assembly;

the second polarizer assembly acts to perform a phase delay on the light exiting from the liquid crystal layer, so as to compensate the light leakage produced during display.

4. The liquid crystal display device according to claim 1, wherein, the first polarizer assembly is located on an inner surface of the lower substrate, and the second polarizer assembly is located on an inner surface of the upper substrate; or the first polarizer assembly is located on an outer surface of the lower substrate, and the second polarizer assembly is located on an outer surface of the upper substrate.

5. The liquid crystal display device according to claim 1, wherein, the optical path differences generated by each of the first wave plate and the second wave plate are the same.

6. The liquid crystal display device according to claim 5, wherein, the optical path differences generated by each of the first wave plate and the second wave plate are ⅙ of the wavelength; and the first wave plate and the second wave plate are ⅙ wave plates.

7. The liquid crystal display device according to claim 1, wherein, the first wave plate is located between the first polarizing plate and the first optical retardation thin film; or the first optical retardation thin film is located between the first polarizing plate and the first wave plate; the second wave plate is located between the second polarizing plate and the second optical retardation thin film; or, the second optical retardation thin film is located between the second polarizing plate and the second wave plate.

8. A phase compensation method for a liquid crystal display device, the liquid crystal display device including a lower substrate, an upper substrate opposed to the lower substrate, a first polarizer assembly located on a surface of the lower substrate, a second polarizer assembly located on a surface of the upper substrate and a liquid crystal layer located between the upper substrate and the lower substrate, wherein, a first wave plate is added to the first polarizer assembly of the liquid crystal display device and a second wave plate is added to the second polarizer assembly; the method further comprising:

conducting a phase delay on light incident from the lower substrate side after the incident light is polarized by the first polarizer assembly;

conducting a positive phase delay on the light coming out of the first polarizer assembly by liquid crystals in the liquid crystal layer of the liquid crystal display device;

conducting a phase delay on the light coming out of the liquid crystal layer by the second polarizer assembly, so as to compensate light leakage produced during display, wherein the relationship between the positive phase delay conducted on the light coming out of the first polarizer assembly by liquid crystal in the liquid crystal layer of the liquid crystal display device and the phase delay conducted on the light by the first polarizer assembly is that, optical path differences of the two are $$\sqrt{3}\frac{\lambda}{2\pi}$$

respectively, in which, $\lambda$ is the wavelength of the incident light.

9. The method according to claim 8, wherein, the first polarizer assembly includes a first polarizing plate, a first optical retardation thin film and the first wave plate; and the second polarizer assembly includes a second polarizing plate, a second optical retardation thin film and the second wave plate;

the first wave plate is located between the first polarizing plate and the first optical retardation thin film; or, the first optical retardation thin film is located between the first polarizing plate and the first wave plate;

the second wave plate is located between the second polarizing plate and the second optical retardation thin film; or, the second optical retardation thin film is located between the second polarizing plate and the second wave plate.

10. The method according to claim 8, wherein, relative to the first polarizing plate, the first optical retardation thin film and the first wave plate are disposed on the liquid crystal layer side; and relative to the second polarizing plate, the second optical retardation thin film and the second wave plate are disposed on the liquid crystal layer side.

* * * * *